(12) United States Patent
Maples

(10) Patent No.: US 7,096,195 B1
(45) Date of Patent: Aug. 22, 2006

(54) METHOD FOR ENHANCING THE EQUITY OF A BUSINESS ENTITY

(76) Inventor: Durham Russell Maples, 1507 Park Cir., Camden, SC (US) 29020

( * ) Notice: Subject to any disclaimer, the term of this patent is extended or adjusted under 35 U.S.C. 154(b) by 1201 days.

(21) Appl. No.: 09/629,749

(22) Filed: Jul. 31, 2000

Related U.S. Application Data

(62) Division of application No. 09/071,878, filed on May 4, 1998, now Pat. No. 6,381,585.

(51) Int. Cl.
*G06F 17/60* (2006.01)

(52) U.S. Cl. ............................................ 705/36; 705/14
(58) Field of Classification Search ................... 705/36, 705/37, 14, 1, 35
See application file for complete search history.

(56) References Cited

U.S. PATENT DOCUMENTS 6,148,293 A * 11/2000 King ........................... 705/35
6,381,585 B1 * 4/2002 Maples et al. ................. 705/36

FOREIGN PATENT DOCUMENTS

JP 020000151624 A * 5/2000

OTHER PUBLICATIONS

Sunway Sale Tobring inRM 360 mil Cash; Malaysia: Sunway Divestment; Jan. 6, 1999.*
U.S. Tax Code—Sec. 269B.
U.S. Tax Code—Sec. 1273 (c) (2).
U.S. Tax Code—Sec. 385, Factor 1.
U.S. Tax Code—Sec. 149 (f) (3).
U.S. Tax Code—Sec. 163—General Statute, (i) (1) (a).
U.S. Tax Code—Sec. 1275 (a) (4).
Federal–Mogul Corporation, Rights Agreement, Paragraph 3, Lines 1–3.
Preferred Share Purchase Rights.
Starwood Lodging 424B2, Paragraph 8, Lines 13–18.
Bruck, Connie; "The Predators Ball."
A Penguin Book; 1988; p. 37–38.
303F.2d620;1962U.S.App.
Universal Casting Corp. V. Commissioner of Internal Revenue 37 T.C. 107; 1961 US Tax Ct. Oct. 31, 1961 p. 1 syllabus.
Munn, Glenn Gaywaine/Garcia, Ferdinand Lawrence, "Encyclopedia of Banking and Finance". Bankers Publishing Company 1973; p. 498. Investment Securities.

* cited by examiner

*Primary Examiner*—Pierre E. Elisca

(57) ABSTRACT

A method of enhancing the equity of a business entity by issuing a debt instrument to the equity share of the business entity. The debt instrument is secured by the written unconditional promise to pay of the business entity and assets of the business entity. The business pays the principal and the interest, from the debt instrument, to the shareholder of record of the equity share of the business entity.

11 Claims, 1 Drawing Sheet

METHOD FOR ENHANCING THE EQUITY OF A BUSINESS ENTITY

REFERENCES CITED

U.S. Tax Code—Sec. 269B
U.S. Tax Code—Sec. 1273 (c)(2)
U.S. Tax Code—Sec. 385, Factor 1
U.S. Tax Code—Sec. 163 (i) (1) (a)
U.S. Tax Code—Sec. 149 (f) (3)
U.S. Tax Code—Sec. 163—General Statute
U.S. Tax Code—Sec.1275 (a) (4)

Other Publications

Bruck, Connie; "The Predators Ball,"
A Penguin Book; 1988; p. 37–38.

Securities and Exchange Commission Filings

Preferred Share Purchase Rights.
Federal-Mogul Corporation, Rights Agreement, Paragraph 3, Lines 1–3.
Starwood Lodging 424B2, Paragraph 8, Lines 13–18.

This is a division of application Ser. No. 09/071,878 filed May 4, 1998, now U.S. Pat. No. 6,381,585.

FIELD OF THE INVENTION

This invention relates to the field of Financial Securities for enhancing the equity of a business entity by issuing a debt instrument to shares of that equity.

BACKGROUND OF THE INVENTION

A business entity or company faces daily challenges in their efforts to make their shares of stock increasingly more valuable. These companies have compelling reasons for wanting to enhance their stock's, or equity's, value. The first is that the company can issue more shares for sale to raise money for company operations and not go into debt to do so. The second reason is the company can reward the shareowners who profit when the shares increase in price. Pleasing the shareowners is important since they are the voters who decide who directs and runs the company. Keeping shareowners happy and stock prices high are invaluable in helping to prevent a proxy fight or hostile takeover. This helps the CEO and executives maintain their jobs since takeovers often lead to the removal of the executives.

Enhancing the stock does not always mean the stock price will increase because other factors are always at work where stock prices are involved. Still enhancing the stock could help keep the price stable and avoid a stock plunge in financially hard times, thereby preventing the picture-perfect climate for a hostile corporate takeover. Stock enhancement provides benefits for the shareowners, executives and CEO.

The most direct way of enhancing stock is to pay dividends to the shareowners. The problem with dividends is that they are included in the corporate revenue when paid, therefore are taxed at the corporate level and again by the individual income tax. This double taxation on the same money reduces the money the shareowners receive. Current corporate tax rates are from fifteen to thirty-five per cent with companies paying thirty-five per cent on any profit over $10,000,000. In spite of this large tax burden, many companies will still pay dividends out of the profits. Other companies will invest in company operations, buy other companies, pay executives large amounts of money, pay for expensive luxuries or use a combination of the four to avoid making a profit. They will then pay dividends by either borrowing money or pay the dividends from company savings. This practice becomes a temporary fix since savings not replenished with taxable profits will eventually be exhausted. Continuing to borrow, if not supported by increased revenues, the corporation will soon collapse under the debt burden. Still this often happens because the tax burden is so great, and yet the rewarding of shareowners to enhance the stock is considered necessary.

The present system and methods are burdened with inefficiencies. The current environment causes many companies to abandon stock enhancement. These companies focus on using profits to reward top executives and expand the company. Instead of paying out money to the IRS and to shareowners, they often make poor acquisitions and CEO's live like kings. If the company begins to suffer financially, they lay-off employees to increase profits and repeat the process. In the meantime, the shareowners receive little or no dividends since dividends are not guaranteed. The stock price drops or becomes stagnant.

There have been some attempts to reward shareowners by using the debt-favoring provision of the U.S. Tax Laws: Interest on bonds is deductible but dividends on stock are not. The financial bonds would be issued directly to the shareowner assuming approximately a thirty-five per cent corporate-income-tax rate. A company that can pay shareowners a rate of nine per cent on dividends can just as easily pay twelve per cent interest on debt because it can deduct the interest. The shareowners have to pay additional money for the bonds and the solution is effective only in the short term. A big problem arises immediately after the shareowners sell the stock but retain the bonds. The new shareowners will not receive the bond interest, so they will soon find dividends sparse and falling stock prices. This situation will cause many corporate management problems since to continue to sell new bonds to all the new shareowners could send the company into bankruptcy. Even though the company receives money from the bond sales, the debt could collapse the company. Still the deductible interest on bonds is a beneficial component of any stock enhancement method or instrument.

There are a variety of financial bonds and their sole purpose is to raise money for the institution that sells or issues the bonds. Bonds are generally defined to be investment securities that differ from stock in that bonds usually have guaranteed payment which is paid before dividends on stock. The guaranteed payment that exists with most bonds is the written unconditional promise to pay the principal amount. This guarantee is a beneficial component of any stock enhancement method or instrument. Bonds are more secure than stock because failure to pay the principal amount on the bonds could legally force the company into bankruptcy. Stocks are more speculative. In the case of a corporate liquidation, the bondowners are in line to be paid before the stockowners. The corporate assets are usually distributed among those wages, holding loans, holding bonds and the end-of-the-line stockowner could receive nothing. The increased investment security of a bond is a beneficial component of any stock enhancement method or instrument.

Convertible bonds are presently the closest form available by which most of the afore-mentioned enhancement elements of a bond are in some way tied to stock. A convertible Security is one that permits the holder, at his or her option and under certain conditions, to exchange an issue for another security. Usually a convertible bond may be exchanged for common stock in the same company, but there are some exceptions in which the holder may receive preferred stock and others in which the security received is an issue of another company. Holders of a convertible security may exercise this option of exchange for a profit, increase yield, avoid a call, or for any other reason they believe valid. The problem with a convertible bond is that it is an either-or proposition. The combined benefits are not exercised or capable of being utilized simultaneously. Once the bond converts to stock, the benefits associated with the bond disappear. When the bond portion of the security is in effect, the benefits that are usually associated with stock such as voting rights, possible stock increases, possible stock splits and possible dividends are not available prior to conversion.

The best stock enhancement should retain the best elements of stock while adding other benefits. An example of an attempt to do this can be found in a corporate structure called pair-shared REIT'S (Real Estate Investment Trusts) or stapled entities. This structure links a share in a real estate investment trust, which is exempt from taxes at the corporate level, with a share in an operating company that can generate income other than rents and mortgages. The shares are paired to trade together as one unit. The problem with this structure is that it is confined to real estate investment trusts and Congress prohibited the structure from tax-exempt status in 1983. In the Tax Code Title 26, Subtitle A, Chapter 1, Subchapter B, Part II, Section 269b, it is stated that stapled entities shall be treated as one entity with entity being defined as any corporation, partnership, trust, association, estate or other form of carrying on a business activity. Several of these pair-shared REIT'S were grandfathered in and today their stock value is greatly increased. So much so, that one of the existing pair-shared REIT'S bought a major corporation (ITT) for billions in stock and cash while generating less than a half-billion dollars in revenue. This demonstrates the potential power of true stock enhancement; particularly, when you consider that the pair-shared REIT'S pay out most of all profits to the shareowners in dividends which are not double taxed.

A slightly different corporate structure is generally referred to in the tax code in two other sections. In Title 26, Subtitle A, Chapter 1, Subchapter P, Part V, Subpart A, Section 1273, it is stated in (c) (2) Treatment of Investments—"In the case of any debt instrument and an option, security, or other property issued together as an investment unit." This shows a bond and a stock can be joined. In the same section (b) (5), Property is defined to include services and the right to use property, but such term does not include money which is relevant when coupled with Title 26, Subtitle A, Chapter 1, Subchapter P, Part V, Subpart A, Section 1275, (a) (5) which states—"any debt obligation of a corporation distributed by such corporation with respect to its stock shall be treated as if it had been issued for property." The two statements together refer to a bond (debt obligation) distributed with respect to its stock (joined to stock) will be treated for tax purposes as if it had been issued for property. This does not include money. There is no reference to any bond being issued with respect to the corporation's stock that has been issued for property or money, only that for tax purposes will be treated as if it had been issued for property. In fact all references to a bond in the tax code are made to the effect that the bond must be issued for something in terms of money or property. The reason is that all bonds have previously only been defined and used as investment securities.

Investment securities in the financial reference literature are defined as generally, all classes of bonds and stocks, regardless of quality. Therefore, any bond issued in an investment unit would be considered an investment security since all classes of bonds are investment securities. To have a bond in such a unit be considered a non-investment security would require a specific stated principal or issue price of zero for that bond. Without that specific statement any reasonable mind must conclude that some money or property was given, by the stockowner, as an issue price or principal for that bond. To have had one price for the entire unit does not automatically lead to the conclusion that the bond issue price is zero and the payment is allocated entirely to the stock. Both are defined as investment securities which by definition requires an investment of money, or property, from the individual or entity that will receive benefits from the bond. There have been no references made to a bond being issued and joined to stock already outstanding. No reference has been made to such bonds being issued and joined to stock for no money or no property, thereby costing the owners of the stock nothing. Nor has there been any reference cited regarding a bond or debt instrument that cannot be owned.

The concept of joining non-investment bonds to stock is a new and important aspect of any stock enhancement method or instrument. The stock enhancement is much more effective if the shareowners pay nothing for the bonds. Any stock enhancement should have the best elements of both stocks and bonds. To add the best elements of bonds to the best elements of stocks, and at no cost to the shareowner, will create a great demand for the stock. The price of the stock will increase which will make both the shareowners and corporate management happy. Shareowners make more money from their stock investments. Corporations can sell or trade stock and get more money or assets for the same shares. This will decrease the chances of corporate takeovers in that the company is too big or its stock too expensive. Therefore, a means is needed to provide a combination of all these elements that can be exercised simultaneously with any business operation under the current tax law.

SUMMARY OF THE INVENTION

Accordingly several objects and advantages of my invention are to provide stock enhancement of a business entity under current tax law. To join a bond, or debt instrument, to equity would add investment security and provide corporate tax deductible payments. The potential price growth of the stock, possible splits of the stock, possible dividends, or any voting rights of the stock would be retained by the shareowners. The cost to the shareowners would be only the price of the stock and nothing for the bond.

The invention is a method and instrument for enhancing the shares of stock of a business entity. Hence the title of the invention is a SHARE BOND which can enhance all types of stock from all types of business operations.

Share Bonds are issued to shares of stock when the corporation gives a written unconditional promise to pay a sum certain in money on a specified date and to pay a fixed rate of interest to the shareholder of record. The sum certain in money is referred to as the principal, issue price, or face value amount. The Share Bond is issued to the stock not to the stockholder. The stockholder's evidence to the right of the interest and the right of the face value amount is the stock certificate or stock ownership. If the stockholder relinquishes ownership of the stock, the right to the interest and the right to the face value amount travel with the stock or stock certificate—not the former stockholder.

The stockowner, shareowner, or stockholder does not pay any money or property for the bond. The corporation or company receives in return for adequate consideration in money's worth the stock or equity enhancement for the face value amount of the bond. The face value amount multiplied by the number of shares is placed on the credit side of the balance sheet as equity enhancement. An equal amount is placed on the debit side of the balance sheet as debt. This debt is owed to the equity/stockholders but the stockholder does not own the Share Bond. The stockholder cannot separate the right to the principal and the right to the interest from the stock to be sold separately. The Share Bond is a book entry bond and is described in Section 149 (f)(3) of the U.S. Tax Code. Section 149 (f)(3) states the right to the principal and the right to the interest of a bond is transferrable. The transfer of ownership of the bond or debt is blatantly omitted in this section. In fact, nowhere in the U.S. Tax Code does it state that a bond or debt must be owned to have the interest be tax deductible. The concept of non-ownership is important with regards to the U.S. Tax Code so that the Share Bond cannot be classified as a dividend at issuance. The shareholder receives no property or money at the time of issuance; therefore, the Share Bond cannot be taxed as a dividend to the shareholder. The shareholder can only be taxed once on the interest and principal when they are paid.

The Share Bond is not exchanged for the outstanding shares of a corporation's stock, but is the addition of rights to the corporation's stock. The non-investment aspect allows the Share Bond to be issued and joined to currently outstanding, or previously issued, shares of stock. This is crucial for a large corporation that has a large number of shares and shareholders. To collect even one penny as principal, or as the issue price, for each bond on each share of stock would be impossible. Stock shares are being traded every day almost continuously, and to track down each share in this incredible ownership fluctuation would be impossible. A large corporation cannot utilize the Share Bond without the principal being zero, unpaid or paid by any means other than any current and/or future shareowner paying any money or property for the bond. The Share Bond's capability to be issued to currently outstanding or previously owned issued stock is a step beyond the instrument described in Section 1273 (c)(2) of the U.S. Tax Code which specifically states "issued together." All other bonds are generally classified in financial encyclopedias and dictionaries as an investment security and requires an investment. The Share Bond operates best without any investment from the shareowners. This feature allows a corporation that sells stock with a debt instrument issued to the share of stock to have the option to redeem the debt instrument early. The reason being that the original buyer of the unit will have no ownership claim on the debt instrument due to the fact that there was no monetary investment. The corporation cannot expect to uniformly collect money for the next debt instrument that will be issued to the share of stock. At this stage, giving shareholders a debt instrument would constitute a taxable event. The invention avoids this problem by issuing not to stockholders but to the stock. This applies to regular maturity also.

The face value of the Share Bond is lower than ordinary bonds and can be as small as one cent. The interest rate the Share Bond pays is much higher than a traditional bond and can be 100% of the face value amount. The U.S. Tax Code permits this high rate of interest in Section 163 (i)(1) as long as the bond maturity date is 5 years or less from issuance date. The interest paid to the shareowner is tax deductible to the corporation under Section 163, General Rule of the U.S. Tax Code.

The Share Bond is unique in that it provides: (1) the capability for shareowners to simultaneously receive the benefits of both a bond and a stock, while purchasing only the stock, (2) the capability for the shareowner of record to receive the benefits of the Share Bond for the price of zero, (3) no taxable event at issuance since the Share Bond is not a property and is more accurately stated as the shareowner being the receiver of benefits, (4) stock enhancement that no other bond can provide since all other bonds are investment securities for raising money, (5) a primary purpose of enhancing stock and must be joined to divisions of equity to function, (6) the only economically feasible means that a stockowner of outstanding or previously issued stock can receive a guaranteed payment and payments that are not subject to double taxation, (7) allows a corporation that sells stock or equity with a debt instrument issued to the share to have the option to mature or redeem the debt instrument early without penalizing the stock in the future, because another debt instrument can be issued to the now outstanding stock or equity without it being a taxable event to the shareholder.

It is an object of the invention to provide a method to enhance the equity of a business entity whether the equity of the business entity is outstanding or being issued for the first 1 time. Another object of the invention is to provide this equity enhancement even if the shareowner does not directly compensate the business entity with money or property. It is another object of the invention to provide a continuing capability to enhance the equity of a business entity. It is a further object of the invention to provide shareowners with greater claim on the assets of a business entity. Further objects and advantages of the invention will become apparent from a consideration of the drawings and ensuing descriptions.

DETAILED DESCRIPTION OF THE PREFERRED EMBODIMENTS

Figure 1:
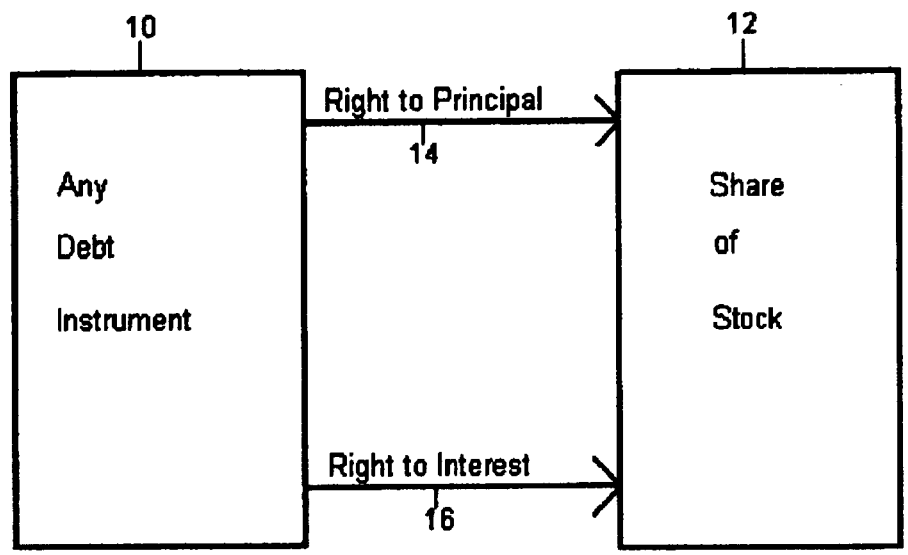
FIG. 1 illustrates in a block diagram form the steps used to enhance the equity of a business entity utilizing a debt instrument of the business entity.

FIG. 1 illustrates a business-entity that gives a written unconditional promise to pay a sum certain in money on a specified date 12 which applies a claim on assets of the business entity 14. Assets of business entity 16 will include physical things as buildings, land, manufacturing equipment or machines, furniture, office equipment, office supplies, product inventory, etc.

In combination, the business entity pays a fixed rate of interest 18. This combination forms a business entity debt instrument 20. The business entity issues the right to the sum certain in money to be paid on a specified date from the debt instrument to a share of equity of the business entity 22. In combination, the business entity issues the right to the fixed rate of interest from the debt instrument to a share of equity of the business entity 24. The business entity staples the right to the sum certain in money to be paid on a specified date from the debt instrument to the share of equity of the business entity 26. In combination, the business entity staples the right to the fixed rate of interest from the debt instrument to the share of equity of the business entity 28. These steps lead to the enhancement of the business equity share of equity 30. These rights now travel with the business entity share of equity 30 and are evidenced by the equity ownership or equity certificate.

The right to the sum certain in money to be paid on a specified date from the debt instrument means that the business entity pays the sum certain in money on a specified date to the shareholder of record of the business entity equity 32. The shareholder of record of the business entity equity 34 is defined as the shareowner that according to the records owned the business entity share of equity on the specified date. A claim on assets of the business entity by the shareholder of record of the business entity 36 is now in effect. The business entity pays fixed rate of interest to the shareholder of record of the business entity equity 38 until the specified date (maturity).

The debt instrument is not owned by the shareholder at any time. The debt instrument rights and claim on assets cannot be separated from the share of equity to be sold or traded separate from the share of equity. The debt instrument is not listed on any security exchange. The right to the sum certain in money (principal or face value amount) and the right to the interest from the debt instrument is issued to the share of equity, not the shareholder. The interest paid to the shareholder of record is tax deductible to the business entity.

What is claimed is:

1. A method of enhancing the equity of a business entity by joining a debt instrument of said business entity to a single share or multiple shares of equity ownership of said business entity by issuing or conveying the right to a sum certain in money to be paid on a specified date to said single share or multiple shares of equity ownership of said business entity and in return said business entity receives adequate consideration in money's worth in the form of equity enhancement of said business entity's own equity and by issuing or conveying the right to the fixed rate of interest of said debt instrument of said business entity to said single share or multiple shares of equity ownership of said business entity, whereby the right to said sum certain in money and the right to the fixed rate of interest of said debt instrument cannot be separated from said single share or multiple shares of equity ownership of said business entity to be sold or traded separate from said single share or multiple shares of equity ownership of said business entity, whereby the shareholder of equity ownership of said business entity exchanges no money or property for said debt instrument, whereby the right to said sum certain in money and the right to the fixed rate of interest of said debt instrument of said business entity cannot be owned by the shareholder of equity ownership of said business entity, whereby said business entity distributes from the assets of said business entity assets equal to the value of the fixed rate of interest of said debt instrument and assets equal to the value of said sum certain in money to the shareholder of record of equity ownership of said business entity, whereby said business entity issues or conveys the right to the assets of said business entity to the shareholder of equity ownership of said business entity that states if said business entity fails to pay said sum certain in money to the shareholder of record of equity ownership of said business entity at the appropriate time then the assets of said business entity will be distributed to the creditors of said business entity, comprising;

said business entity forms said debt instrument by issuing a written unconditional promise to pay said sum certain in money on said specified date and pays a fixed rate of interest until said specified date, said business entity joins said debt instrument to said single share or multiple shares of equity ownership of said business entity by issuing or conveying the right to said sum certain in money to said single share or multiple shares of equity ownership of said business entity and in return said business entity receives adequate consideration in money's worth in the form of equity enhancement of said single share or multiple share of equity ownership of said business entity, said business entity issues or conveys the right to the fixed rate of interest of said debt instrument of said business entity to said single share or multiple shares of equity ownership of said business entity, said business entity issues a prohibition on the right of said sum certain in money from being separated from said single share or multiple shares of equity ownership of said business entity to be sold or traded separate from said single share or multiple shares of equity ownership of said business entity, said business entity issues a prohibition on the right of the fixed rate of interest of said debt instrument of said business entity from being separated from said single share or multiple shares of equity ownership of said business entity to be sold or traded separate from said single share or multiple shares of equity ownership of said business entity, said business entity issues a prohibition on the shareholder of said share or shares of equity of said business entity from exchanging any money or property for the right to said sum certain in money, said business entity issues a prohibition on the right of said sum certain in money from being owned by the shareholder of said single share or multiple shares of equity ownership of said business entity, said business entity issues a prohibition on the right to the fixed rate of interest of said debt instrument of said business entity from being owned by the shareholder of said single share or multiple shares of equity ownership of said business entity, said business entity distributes from the assets of said business entity assets equal to the value of the fixed rate of interest of said debt instrument to the shareholder of record of equity of ownership of said business entity, said business entity distributes from the assets of said business entity assets equal to the value of said sum certain in money to the shareholder of record of equity ownership of said business entity, and said business entity issues or conveys the right to the assets of said business entity to the shareholder of equity ownership of said business entity that states if said business entity fails to pay said sum certain in money to the shareholder of record of equity ownership of said business entity at the appropriate time then the assets of said business entity will be distributed to the creditors of said business entity.

2. A method of enhancing the equity ownership of a business entity by issuing a debt instrument of said business entity to a single share or multiple shares of equity ownership of said business entity, comprising;

said business entity forms said debt instrument by issuing a written unconditional promise to pay a sum certain in money on a specified date and pays a fixed rate of interest until said specified date, said business entity joins said debt instrument to said single share or multiple shares of equity ownership of said business entity by issuing or conveying the right to said sum certain in money to said single share or multiple shares of equity ownership of said business entity and in return said business entity receives adequate consideration in money's worth in the form of equity enhancement of said single share or multiple share of equity ownership of said business entity, said business entity issues or conveys the right to the fixed rate of interest of said debt instrument of said business entity to said single share or multiple shares of equity ownership of said business entity, said business entity issues a prohibition to the right of said sum certain in money from being separated from said single share or multiple shares of equity ownership of said business entity to be sold or traded separate from said single share or multiple shares of equity ownership of said business entity, said business entity issues a prohibition to the right of the fixed rate of interest of said debt instrument of said business entity from being separated from said single share or multiple shares of equity ownership of said business entity to be sold or traded separate from said single share or multiple shares of equity ownership of said business entity, said business entity issues or conveys the right to the fixed rate of interest of said debt instrument of said business entity to said single share or multiple shares of equity ownership of said business entity, said business entity issues a prohibition on the right of said sum certain in money from being separated from said single share or multiple shares of equity ownership of said business entity to be sold or traded separate from said single share or multiple shares of equity ownership of said business entity, said business entity issues a prohibition on the right of the fixed rate of interest of said debt instrument of said business entity from being separated from said single share or multiple shares of equity ownership of said business entity to be sold or traded separate from said single share or multiple shares of equity ownership of said business entity, said business entity issues a prohibition on the shareholder of said share or shares of equity of said business entity from exchanging any money or property for the right to said sum certain in money, said business entity issues a prohibition on the right of said sum certain in money from being owned by the shareholder of said single share or multiple shares of equity ownership of said business entity, said business entity issues a prohibition on the right to the fixed rate of interest of said debt instrument of said business entity from being owned by the shareholder of said single share or multiple shares of equity ownership of said business entity, said business entity distributes from the assets of said business entity assets equal to the value of the fixed rate of interest of said debt instrument to the shareholder of record of equity of ownership of said business entity, said business entity distributes from the assets of said business entity assets equal to the value of said sum certain in money to the shareholder of record of equity ownership of said business entity, said business entity issues or conveys the right to the assets of said business entity to the shareholder of equity ownership of said business entity that states if said business entity fails to pay said sum certain in money to the shareholder of record of equity ownership of said business entity at the appropriate time then the assets of said business entity will be distributed to the creditors of said business entity, and said business entity calculates any amortization of said sum certain in money of said debt instrument by using a computer.

3. A method of enhancing the equity of a business entity by issuing a debt instrument of said business entity to a single share or multiple shares of equity ownership of said business entity, comprising;

said business entity forms said debt instrument by issuing a written unconditional promise to pay a sum certain in money on a specified date and pays a fixed rate of interest until said specified date, said business entity issues or conveys in writing on the right to said sum certain in money to said single share or multiple shares of equity ownership of said business entity and in return said business entity receives adequate consideration in money's worth in the form of equity enhancement of said single share or multiple shares of equity ownership of said business entity, said business entity issues or conveys in writing on the right to said fixed rate of interest to said single share or multiple shares of equity ownership of said business entity, said business entity issues a prohibition in writing on the right to said sum certain in money from being separated from said single share or multiple shares of equity ownership of said business entity to be sold or traded separate from said single share or multiple shares of equity of said business entity, said business entity issues a prohibition in writing on the right to said fixed rate of interest from being separated from said single share or multiple shares of equity ownership of said business entity to be sold or traded separate from said share or shares of equity of said business entity, said business entity issues a prohibition in writing on the right to said sum certain in money from being owned by the shareholder of said share or shares of equity of said business entity, said business entity issues a prohibition in writing on the right to said fixed rate of interest from being owned by the shareholder of said share or shares of equity of said business entity, said business entity distributes from the assets of said business entity assets equal to the value of the fixed rate of interest of said debt instrument that are tax deductible to said business entity to the shareholder of record of equity of ownership of said business entity, said business entity distributes from the assets of said business entity assets equal to the value of said sum certain in money to the shareholder of record of equity ownership of said business entity, said business entity issues or conveys the right to the assets of said business entity to the shareholder of equity ownership of said business entity that states if said business entity fails to pay said sum certain in money to the shareholder of record of equity ownership of said business entity at the appropriate time then the assets of said business entity will be distributed to the creditors of said business entity.

4. The method or process of claim 1, comprising said business issues said debt instrument that cannot be separated form said single share or multiple shares of equity ownership of said business entity except by said business entity paying said sum certain in money to the shareholder of equity ownership of said business entity or to exchange another debt instrument of said business entity that is issued to said single share or multiple shares of equity ownership of said business entity and said debt instrument of said business entity cannot be owned by the shareholder of equity ownership of said business entity.

5. The method or process of claim 1, comprising said business entity issues said debt instrument that pays said fixed rate of interest to the shareholder of record of equity ownership of said business entity and a portion of said fixed rate of interest is tax deductible to said business entity.

6. The method or process of claim 1, comprising said business entity issues said debt instrument, whereby said business entity can amortize said sum certain in money of said debt instrument.

7. The method or process of claim 2, comprising said business entity issuing said debt instrument that cannot be separated from said single share or multiple shares of equity ownership of said business entity except by said business entity paying said sum certain in money to the shareholder of equity of said business entity or to exchange another debt instrument of said business entity that is issued to said single share or multiple shares of equity of said business entity and said another debt instrument of said business entity cannot be owned by the shareholder of equity of said business entity.

8. The method or process of claim 2, comprising said business entity fails to pay said sum certain in money to the shareholder of record of equity ownership of said business entity at the appropriate time and the assets of said business entityt are distributed to the creditors of said business entity and the individual amounts of assets to be distributed are calculated by a computer.

9. The method or process of claim 2, comprising said debt instrument that cannot be separated form said share or shares of equity of said business entity except by said business entity paying said sum certain in money from assets of said business entity to the shareholder of equity of said business entity or to exchange another debt instrument of said another debt instrument of said business entity cannot be owned by the sharehold of equity of said business entity.

10. The method or process of claim 3, comprising said sum certain in money that said business entity can amortize.

11. The method or process of claim 3, comprising said business entity to secure with the assets of said business entity said sum certain in money to be paid the shareholder of record on said specified date.

* * * * *